United States Patent

Bartos et al.

[11] Patent Number: 5,669,626
[45] Date of Patent: Sep. 23, 1997

[54] INFLATABLE OCCUPANT RESTRAINT SYSTEM

[75] Inventors: Christopher James Bartos, Rochester Hills; Albert James Dapoz, Sterling Heights; Daniel Cornelius Bach, Jr., Belleville, all of Mich.

[73] Assignee: Ford Motor Company, Dearborn, Mich.

[21] Appl. No.: 629,159

[22] Filed: Apr. 8, 1996

[51] Int. Cl.⁶ .................................. B60R 21/16
[52] U.S. Cl. ........................ 280/728.2; 280/732
[58] Field of Search .................. 280/728.2, 732

[56] References Cited

U.S. PATENT DOCUMENTS

| | | | |
|---|---|---|---|
| 2,755,125 | 7/1956 | Hodges | 280/734 |
| 4,834,421 | 5/1989 | Korber et al. | 280/732 |
| 5,092,628 | 3/1992 | Tamura et al. | 280/731 |
| 5,135,252 | 8/1992 | Suran et al. | 280/732 |
| 5,145,207 | 9/1992 | Bederka et al. | 280/732 |
| 5,259,642 | 11/1993 | Muller et al. | 280/732 |
| 5,263,739 | 11/1993 | Webber et al. | 280/728.2 |
| 5,398,960 | 3/1995 | Ravenberg et al. | 280/728.3 |
| 5,403,034 | 4/1995 | Gans et al. | 280/728.3 |
| 5,489,116 | 2/1996 | Boag | 280/728.2 |
| 5,527,064 | 6/1996 | Kai et al. | 280/728.2 |
| 5,538,277 | 7/1996 | Frary et al. | 280/728.2 |
| 5,577,764 | 11/1996 | Webber et al. | 280/728.2 |

*Primary Examiner*—Kenneth R. Rice
*Attorney, Agent, or Firm*—Daniel M. Stock; Lynn M. DaDamio

[57] ABSTRACT

An inflatable occupant restraint system for an automotive vehicle is provided. The vehicle includes a body structure having a laterally extending beam and an instrument panel carried with the body structure. The occupant restraint system includes an air bag module, an aperture formed in the instrument panel which receives the air bag module, and a trim portion of the instrument panel fixedly secured to the air bag module in overlying relationship thereto for closing the aperture. The occupant restraint system further includes a latch assembly having a portion thereof directly connected to the laterally extending beam and another portion thereof directly connected to the air bag module. The latch assembly releasably secures the air bag module to the beam.

12 Claims, 2 Drawing Sheets

INFLATABLE OCCUPANT RESTRAINT SYSTEM

BACKGROUND OF THE INVENTION

1. Field of the Invention

The present invention relates generally to automotive inflatable occupant restraint systems, and more specifically to structures for mounting inflatable occupant restraint devices within automotive vehicles.

2. Description of Related Art

To reduce costs and increase reliability in the assembly of inflatable occupant restraint devices in automotive vehicles, it is desirable to simplify the assembly method and apparatus to optimal levels. It has been the predominant practice in the prior art with respect to the assembly of vehicle passenger-side air bag modules to fixedly secure the air bag module to the vehicle body structure using a plurality of threaded fasteners. This attachment technique is exemplified in U.S. Pat. No. 5,135,252. A drawback of the approach is that the use of multiple threaded fasteners adversely affects the speed and complexity of the assembly process. Moreover, once assembled to the body structure, the air bag module is not readily removable therefrom for service or replacement.

SUMMARY OF THE INVENTION

The present invention provides an inflatable occupant restraint system for an automotive vehicle which overcomes the above-described drawbacks of the prior art. The vehicle in which the system is adapted for use includes a body structure having a laterally extending beam and an instrument panel carried within the body structure. The occupant restraint system comprises an air bag module, means defining an aperture through the instrument panel which receives the air bag module, and a trim portion of the instrument panel fixedly secured to the air bag module in overlying relationship thereto for closing the aperture. In addition, the occupant restraint system comprises a latch assembly having a portion thereof directly connected to the laterally extending beam and another portion thereof directly connected to the air bag module. The latch assembly selectively releasably secures the air bag module to the beam.

According to one aspect of the present invention, the latch assembly comprises a pair of latch members engageable with a pair of strikers.

According to another aspect of the present invention, the occupant restraint system includes a release bar coupled between the pair of latch members for permitting simultaneous release of the pair of strikers from the pair of latch members.

It is an advantage of the present invention to permit rapid latching engagement of the air bag module directly to the vehicle body structure.

It is a further advantage of the present invention to permit ready removal of the air bag module from the vehicle for servicing or replacement.

These and other features and advantages of the present invention will be more fully described below with reference to the following detailed description and drawings.

DETAILED DESCRIPTION OF THE PREFERRED EMBODIMENTS

Figure 1:
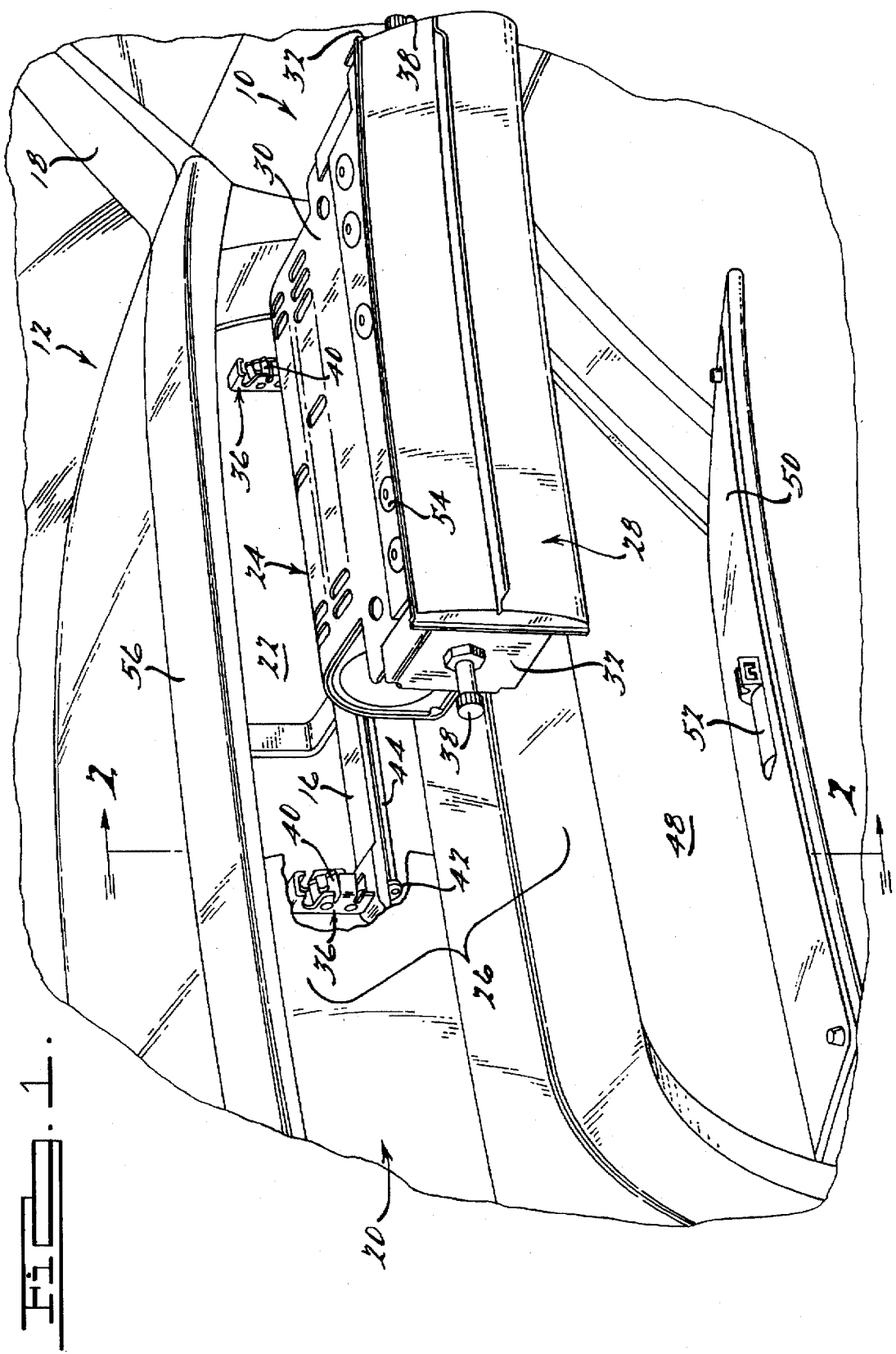
FIG. 1 is a partially cut-away, exploded perspective view of an inflatable occupant restraint system according to the present invention.

Turning now to the drawings, and in particular to FIG. 1 thereof, an inflatable occupant restraint system 10 adapted for use in automotive vehicle 12 is shown. As is conventional, vehicle 12 has a body structure which includes a laterally extending structural member, such as cross-car beam 16. Beam 16 is fixedly secured between a pair of vertically extending structural members 18, commonly referred to as A-pillars (one shown), which structurally connect the vehicle roof and floor (not shown). An instrument panel 20 is carried within the body structure in conventional fashion, and extends laterally across vehicle 12 in a direction generally parallel to the lateral extent of beam 16. An aperture 22 formed in instrument panel 20 is positioned on the passenger side of vehicle 12 in alignment with beam 16.

Figure 2:
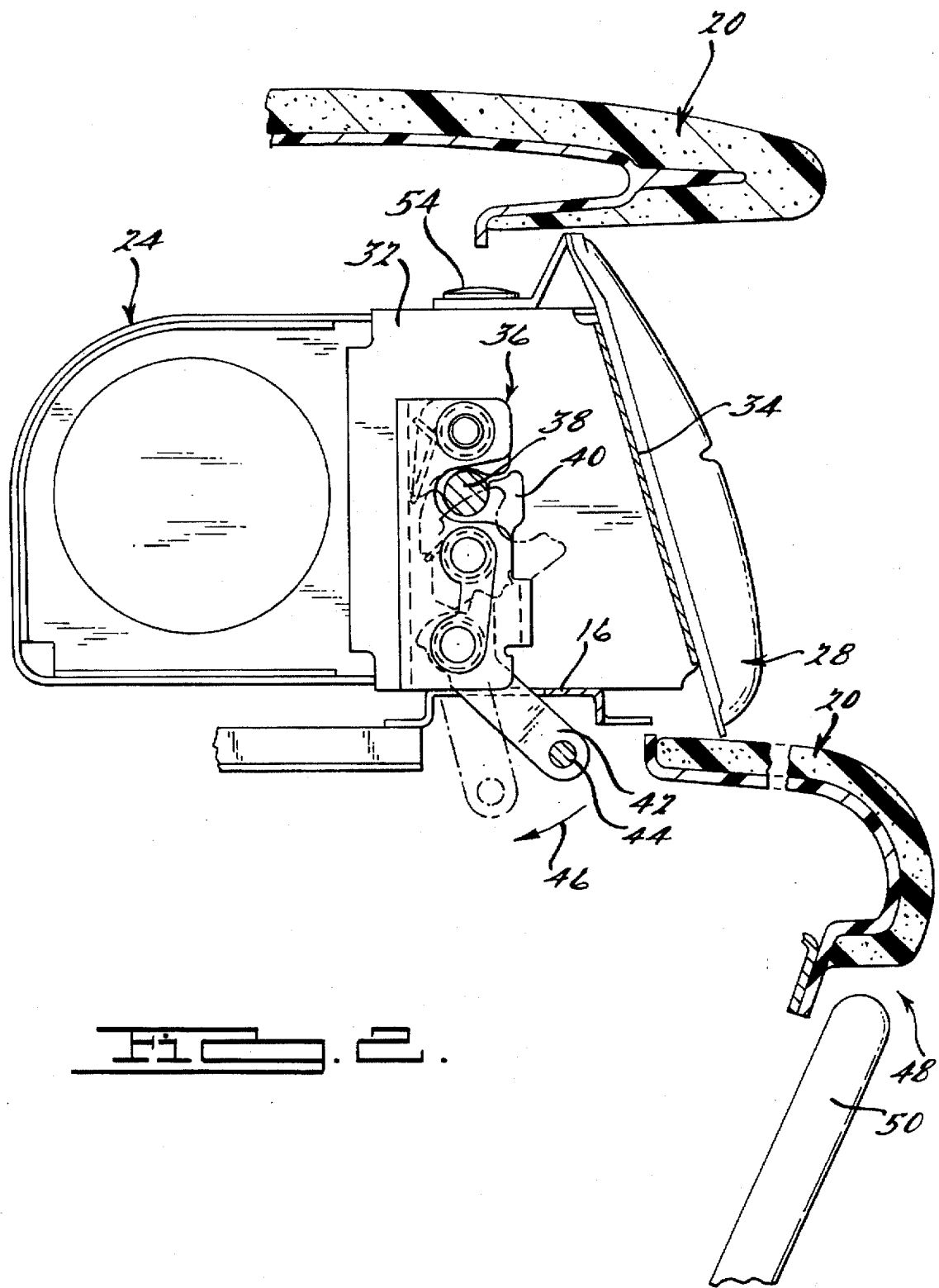
FIG. 2 is a sectional view taken along line 2—2 of FIG. 1, showing the occupant restraint system in assembled position.

With reference now to FIGS. 1 and 2, occupant restraint system 10 is illustrated as comprising a laterally elongated air bag module 24, a latch assembly 26 for releasably securing air bag module 24 to cross-car beam 16, and a trim portion 28 for concealing air bag module 24 from the occupants of the vehicle. As is conventional, air bag module 24 includes a box-like, preferably metallic housing 30 for containing an air bag and an air bag inflator device (not shown). Housing 30 defines a pair of closed, laterally spaced apart ends 32 and an open deployment end 34 opposite the inflator device through which the air bag is designed to deploy.

Latch assembly 26 is a multipiece assembly having a portion thereof directly connected to cross-car beam 16 and another portion thereof directly connected to air bag module 24. As illustrated in FIGS. 1 and 2, latch assembly 26 may comprise a pair of latch members 36 engageable with a pair of strikers 38. Latch members 36 are preferably connected to beam 16 as by welding, while strikers 38 are preferably connected to air bag module 24. As illustrated, strikers 38 may be conveniently located at each end 32 of air bag module 24. Strikers 38 may be suitably secured to module 24 by being bolted or welded thereon. Latch members 36 are positioned in spaced apart relationship on beam 16 in registration with strikers 38 such that upon insertion of air bag module 24 through aperture 22, strikers 38 are received in secure, latching engagement with the catch arms 40 of latch members 36 in a manner well known in the mechanical latching arts. No other fastening means are required to fix air bag module 24 within vehicle 12. Preferred latch members 36 for use with the present invention include rotary latch members of the type commercially available from Eberhard Manufacturing Co. of Cleveland, Ohio under the product designations "MINI-ROTARY" Lock 8-240-R/L and Rotary Lock 3-400-R/L. Removal of module 24 from vehicle 12 may be accomplished through manipulation of release arms 42 of latch members 36. As best illustrated in FIG. 2, release arms 42 are operatively connected through suitable pivot means to catch arms 40 to move catch arms 40 between positions latching and releasing strikers 38. Preferably, a Single release bar 44 joins the release arms 40 of latch members 36 such that actuation of release bar 44 in the direction indicated by arrow 46 in FIG. 2 operates to simultaneously release strikers 38 from latch members 36. Release bar 44 is illustrated as being accessible through a selectively openable aperture 48 in instrument panel 20. As illustrated, aperture 48 may comprise a glove box opening in suitable registration with release bar 44. Release bar 44 may be conveniently accessed through the glove box opening by simply opening glove box door 50. Unwanted access to release bar 44 may be prevented, on the other hand, by employing a locking mechanism 52 to lock glove box door 50 in the closed position.

As previously indicated, trim portion 28 of instrument panel 20 is provided to close aperture 22 and conceal air bag module 24 from the occupants of vehicle 12 while the air bag is in an undeployed state. As is conventional, trim portion 28 covers end 34 of housing 30 and is configured to fit within aperture 22 in coplanar relationship thereto. Any suitable fastening means, such as rivets 54, may be used to secure trim portion 28 to housing 30. If desired, trim portion 28 may include locating means (not shown) for facilitating the positioning of trim portion 28 and air bag module 24 with respect to aperture 22.

While the invention has been shown and described in its preferred embodiments, it will be clear to those skilled in the automotive vehicle occupant restraint arts that many changes and modifications may be made thereto without departing from the scope of the invention. For example, while latch members 36 are illustrated as being connected to cross-car beam 16, and strikers 38 are illustrated as being connected to air bag module 24, it will be understood that latch members 36 could alternatively be attached to air bag module 24 while strikers 38 could be attached to cross-car beam 16. Moreover, while a latch assembly comprising a pair of rotary latch members and a pair of strikers is illustrated, it will be understood that various other latch assembly configurations are possible, including a latch assembly comprising a single latch member and a single striker. In addition, it will be understood that while trim portion 28 is illustrated as being similar in size to end 34 of module housing 30, trim portion 28 could, alternatively, comprise a larger piece of the instrument panel and be arranged to register with another portion of the instrument panel, such as the upper surface indicated at 56 in FIG. 1. A trim portion so configured would commonly be referred to as a topper pad. These and other modifications which fall within the true scope of this invention are intended to be included within the terms of the appended claims.

What is claimed is:

1. An inflatable occupant restraint system for an automotive vehicle having a body structure including a laterally extending beam and an instrument panel carried within the body structure, the occupant restraint system comprising:
   an air bag module;
   means defining an aperture through the instrument panel, said aperture receiving said air bag module;
   a trim portion of the instrument panel fixedly secured to said air bag module in overlying relationship thereto for closing said aperture; and
   a latch assembly having a portion thereof directly connected to the laterally extending beam and another portion thereof directly connected to said air bag module, said latch assembly selectively releasably securing said air bag module to the beam.

2. An occupant restraint system as defined in claim 1, wherein said latch assembly comprises at least one latch member engageable with at least one striker in latching relationship.

3. An occupant restraint system as defined in claim 2, wherein said at least one latch member is directly attached to the laterally extending beam and said at least one striker is directly attached to said air bag module.

4. An occupant restraint system as defined in claim 2, wherein said at least one latch member comprises a pair of latch members and said at least one striker comprises a pair of strikers.

5. An occupant restraint system as defined in claim 4, wherein said air bag module defines a pair of laterally spaced apart ends, each one of said pair of ends having one of said pair of strikers attached thereto.

6. An occupant restraint system as defined in claim 5, wherein said pair of latch members are attached to the laterally extending beam in laterally spaced apart relationship in registration with said pair of strikers.

7. An occupant restraint system as defined in claim 6, wherein each one of said pair of latch members includes a catch arm receiving one of said pair of strikers and a release arm operatively connected to said catch arm for moving said catch arm between latching and releasing positions, and wherein a release bar couples the release arm of one of said pair of latch members to the release arm of the other of said pair of latch members for permitting simultaneous release of said pair of strikers from said latch member catch arms.

8. An occupant restraint system as defined in claim 7, wherein the instrument panel includes a selectively openable aperture in registration with said release bar, such that said release bar is accessible through the selectively openable aperture.

9. An occupant restraint system as defined in claim 2, wherein said at least one striker is directly attached to the laterally extending beam and said at least one latch member is directly attached to said air bag module.

10. An inflatable occupant restraint system for an automotive vehicle having a body structure including a laterally extending beam and an instrument panel carried within the body structure, the occupant restraint system comprising:
    an air bag module;
    means defining an aperture through the instrument panel, said aperture receiving said air bag module;
    a trim portion of the instrument panel fixedly secured to said air bag module in overlying relationship thereto for closing said aperture; and
    a latch assembly releasably securing said air bag module to the laterally extending beam, said latch assembly including a pair of latch members directly attached to the beam in laterally spaced apart relationship and a pair of strikers directly attached to said air bag module in registration with said pair of latch members for engagement therewith.

11. An occupant restraint system as defined in claim 10, wherein each one of said pair of latch members includes a catch arm receiving one of said pair of strikers and a release arm operatively connected to said catch arm for moving said catch arm between latching and releasing positions, and wherein a release bar couples the release arm of one of said pair of latch members to the release arm of the other of said pair of latch members for permitting simultaneous release of said pair of strikers from said latch member catch arms.

12. An occupant restraint system as defined in claim 11, wherein the instrument panel includes a selectively openable aperture in registration with said release bar, such that said release bar is accessible through the selectively openable aperture.

* * * * *